US012795097B2

(12) United States Patent
Sharma et al.

(10) Patent No.: US 12,795,097 B2
(45) Date of Patent: Nov. 10, 2026

(54) LEARNING BASED METHODS FOR REAL-TIME OMNIDIRECTIONAL VIDEO STREAMING

(71) Applicant: Technology Innovation Institute—Sole Proprietorship LLC, Masdar City (AE)

(72) Inventors: Mohit Kumar Sharma, Abu Dhabi (AE); Brahim Farhat, Abu Dhabi (AE); Wassim Hamidouche, Abu Dhabi (AE)

(73) Assignee: Technology Innovation Institute—Sole Proprietorship LLC, Masdar City (AE)

( * ) Notice: Subject to any disclaimer, the term of this patent is extended or adjusted under 35 U.S.C. 154(b) by 0 days.

(21) Appl. No.: 19/006,667

(22) Filed: Dec. 31, 2024

(65) Prior Publication Data

US 2025/0233995 A1 Jul. 17, 2025

Related U.S. Application Data

(60) Provisional application No. 63/619,789, filed on Jan. 11, 2024.

(51) Int. Cl.
*H04N 19/124* (2014.01)
*G06T 7/20* (2017.01)
(Continued)

(52) U.S. Cl.
CPC ............. *H04N 19/124* (2014.11); *G06T 7/20* (2013.01); *G06V 10/44* (2022.01); *G06V 10/70* (2022.01); *G06V 20/17* (2022.01)

(58) Field of Classification Search
CPC ............... H04N 19/124; H04N 19/164; H04N 21/2343; H04N 21/2402; H04N 21/251;
(Continued)

(56) References Cited

U.S. PATENT DOCUMENTS 12,149,708 B2 11/2024 Boddeti et al.
2021/0203951 A1 7/2021 Kottke et al.
(Continued)

OTHER PUBLICATIONS

International Search Report and Written Opinion for Application No. PCT/IB2024/063344, mailed on Feb. 28, 2025, 11 Pages.
(Continued)

*Primary Examiner* — Susan E. Hodges
(74) *Attorney, Agent, or Firm* — DLA Piper LLP (US)

(57) ABSTRACT

A system comprising a video camera configured to create a video stream, and at least one processor configured to extract at least one video feature from the video stream, process the video stream according to at least one processing parameter to produce a processed video stream, encode the processed video stream according to at least one encoding parameter to produce an encoded video stream, transmit the encoded video stream through a network, receive at least one network metric based on the encoded video stream transmitted through the network, input the at least one video feature and the at least one network metric to a machine learning model to predict updates to the at least one processing parameter and the at least one encoding parameter, and process the video stream and encode the processed video stream according to the updates.

18 Claims, 5 Drawing Sheets

(51) Int. Cl.
*G06V 10/44* (2022.01)
*G06V 10/70* (2022.01)
*G06V 20/17* (2022.01)

(58) Field of Classification Search
CPC ............... H04N 19/134; H04N 19/136; H04N 21/23805; H04N 19/169; H04N 21/44; G06T 7/20; G06T 2207/20004; G06T 2207/20081; G06V 10/44; G06V 10/70; G06V 20/17; H04L 47/38; H04L 47/2416; H04L 47/801; G06N 3/092; G06N 20/00
USPC .......................................................... 375/240
See application file for complete search history.

(56) References Cited

U.S. PATENT DOCUMENTS

| | | | | |
|---|---|---|---|---|
| 2022/0138568 | A1* | 5/2022 | Smolyanskiy ....... | G06N 3/0442 706/21 |
| 2022/0239925 | A1 | 7/2022 | Topiwala et al. | |
| 2022/0314434 | A1* | 10/2022 | Kranski ................... | B25J 9/163 |
| 2022/0408097 | A1* | 12/2022 | Lin ...................... | H04N 19/136 |
| 2023/0048189 | A1 | 2/2023 | Boddeti et al. | |
| 2023/0188764 | A1 | 6/2023 | Pahalawatta et al. | |
| 2024/0244228 | A1* | 7/2024 | Ram .................... | H04N 19/124 |

OTHER PUBLICATIONS

Rossi S., et al., "Navigation-Aware Adaptive Streaming Strategies for Omnidirectional Video," 2017 IEEE 19th International Workshop on Multimedia Signal Processing (MMSP), 2017, 6 pages, Retrieved from Internet: URL: https://ieeexplore.ieee.org/abstract/document/8122230.

Xiao G., et al., "DeepVR: Deep Reinforcement Learning for Predictive Panoramic Video Streaming," IEEE Transactions on Cognitive Communications and Networking, Sep. 4, 2019, vol. 5, No. 4, pp. 1167-1177, Retrieved from Internet: URL: https://ieeexplore.ieee.org/abstract/document/8823963.

Xiao X., et al., "Sensor-Augmented Neural Adaptive Bitrate Video Streaming on UAVs," IEEE Transactions on Multimedia, Sep. 23, 2019, vol. 22, No. 6, pp. 1567-1576, Retrieved from Internet: URL: https://ieeexplore.ieee.org/abstract/document/8855031.

Office Action of AE Application No. P2025-00085, dated Apr. 28, 2026, 10 pages.

* cited by examiner

LEARNING BASED METHODS FOR REAL-TIME OMNIDIRECTIONAL VIDEO STREAMING

CROSS-REFERENCE TO RELATED APPLICATIONS

This application claims priority to U.S. Provisional Application No. 63/619,789, filed Jan. 11, 2024, which is incorporated by reference in its entirety.

FIELD

A system and method for learning based methods for real-time omnidirectional video streaming.

BACKGROUND

Omnidirectional video is a process utilized for various applications. Real-time streaming requirements, however, for these applications place tight constraints on both throughput and end-to-end latency. Conventional omnidirectional video processing systems attempt to address these constraints through implementation of a bandwidth controller that adjusts one or more transmission parameters in real-time. Conventional bandwidth controllers, however, inaccurately and inefficiently control transmission parameters.

SUMMARY

In one aspect, the present disclosure relates a system for controlling video streaming. The controller comprising a video camera configured to capture video and create a video stream, and at least one processor configured to extract at least one video feature from the video stream, process the video stream according to at least one processing parameter to produce a processed video stream, encode the processed video stream according to at least one encoding parameter to produce an encoded video stream, transmit the encoded video stream through a network, receive at least one network metric based on the encoded video stream transmitted through the network; input the at least one video feature and the at least one network metric to a machine learning model to predict updates to the at least one processing parameter and the at least one encoding parameter, and process the video stream and encode the processed video stream according to the updates to the at least one processing parameter and the at least one encoding parameter.

In embodiments of this aspect, the disclosed system according to any one of the above example embodiments, the at least one processor executes the machine learning model as a reinforcement learning model that predicts the updates to the at least one processing parameter and the at least one encoding parameter, receives a reward based on a performance metric computed from the updates, and updates prediction weights based on the reward.

In embodiments of this aspect, the disclosed system according to any one of the above example embodiments, the performance metric for computing the reward comprises at least one of video freezing time, latency between a time of capturing the video to a time of displaying the video, or video quality.

In embodiments of this aspect, the disclosed system according to any one of the above example embodiments, the at least one video feature extracted from the video stream comprises at least one of detail or motion in the video stream.

In embodiments of this aspect, the disclosed system according to any one of the above example embodiments, the at least one network metric comprises at least one of network bandwidth, latency, packet loss, jitter and error rate.

In embodiments of this aspect, the disclosed system according to any one of the above example embodiments, the at least one processing parameter comprises at least one of video resolution, frame rate, or magnification; and In embodiments of this aspect, the disclosed system according to any one of the above example embodiments, the at least one encoding parameter comprises video quantization or encoding rate.

In embodiments of this aspect, the disclosed system according to any one of the above example embodiments, the video camera is a 360° camera that is configured to capture 360° video and create the video stream from the 360° video; and In embodiments of this aspect, the disclosed system according to any one of the above example embodiments, the at least one processor is further configured to transmit the video stream to a wearable device that displays a viewport of the 360° video.

In embodiments of this aspect, the disclosed system according to any one of the above example embodiments, the wearable device is a pair of virtual reality (VR) goggles.

In embodiments of this aspect, the disclosed system according to any one of the above example embodiments, the video camera is mounted to a drone for capturing the 360° video from a perspective of the drone.

In embodiments of this aspect, the disclosed system according to any one of the above example embodiments, the processor is further configured to capture at least one drone parameter comprising at least one of velocity, position or altitude of the drone and input the at least one drone parameter to the machine learning model to predict the updates to the at least one processing parameter and the at least one encoding parameter.

In one aspect, the present disclosure relates to a method for controlling video streaming. The method comprising capturing, by a video camera, creating a video stream, and extracting, by at least one processor, at least one video feature from the video stream, processing, by the at least one processor, the video stream according to at least one processing parameter to produce a processed video stream, encoding, by the at least one processor, the processed video stream according to at least one encoding parameter to produce an encoded video stream, transmitting, by the at least one processor, the encoded video stream through a network, receiving, by the at least one processor, at least one network metric based on the encoded video stream transmitted through a network, inputting, by the at least one processor, the at least one video feature and the at least one network metric to a machine learning model to predict updates to the at least one processing parameter and the at least one encoding parameter, and processing, by the at least one processor, the video stream and encode the processed video stream according to the updates to the at least one processing parameter and the at least one encoding parameter.

In embodiments of this aspect, the disclosed method comprises executing, by the at least one processor, the machine learning model as a reinforcement learning model that predicts the updates to the at least one processing parameter and the at least one encoding parameter, receives a reward based on a performance metric computed from the updates, and updates prediction weights based on the reward.

In embodiments of this aspect, the disclosed method comprises computing, by the at least one processor, the reward based on a performance metric comprising at least one of video freezing time or latency between a time of capturing the video to a time of displaying the video, or video quality.

In embodiments of this aspect, the disclosed method comprises extracting, by the at least one processor, from the video stream the at least one video feature comprising at least one of detail or motion in the video stream.

In embodiments of this aspect, the disclosed method comprises receiving, by the at least one processor, the at least one network metric comprising at least one of network bandwidth, latency, packet loss, jitter or error rate.

In embodiments of this aspect, the disclosed method comprises setting, by the at least one processor, at least one of video resolution, frame rate, or magnification as the at least one processing parameter, and setting, by the at least one processor, video quantization as the at least one encoding parameter or encoding rate.

In embodiments of this aspect, the disclosed method comprises capturing, by the video camera, 360° video and creating the video stream from the 360° video, and transmitting, by the at least one processor, the video stream to a wearable device that displays a viewport of the 360° video.

In embodiments of this aspect, the disclosed method comprises transmitting, by the at least one processor, the video stream to the wearable device that comprises virtual reality (VR) goggles.

In embodiments of this aspect, the disclosed method comprises capturing, by the video camera, the 360° video from a perspective of a drone to which the camera is mounted.

In embodiments of this aspect, the disclosed method comprises capturing, by the at least one processor, at least one drone parameter comprising at least one of velocity, position or altitude of the drone, and inputting, by the at least one processor, the at least one drone parameter to the machine learning model to predict the updates to the at least one processing parameter and the at least one encoding parameter.

BRIEF DESCRIPTION OF THE DRAWINGS

So that the way the above-recited features of the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

DETAILED DESCRIPTION

Figure 1:
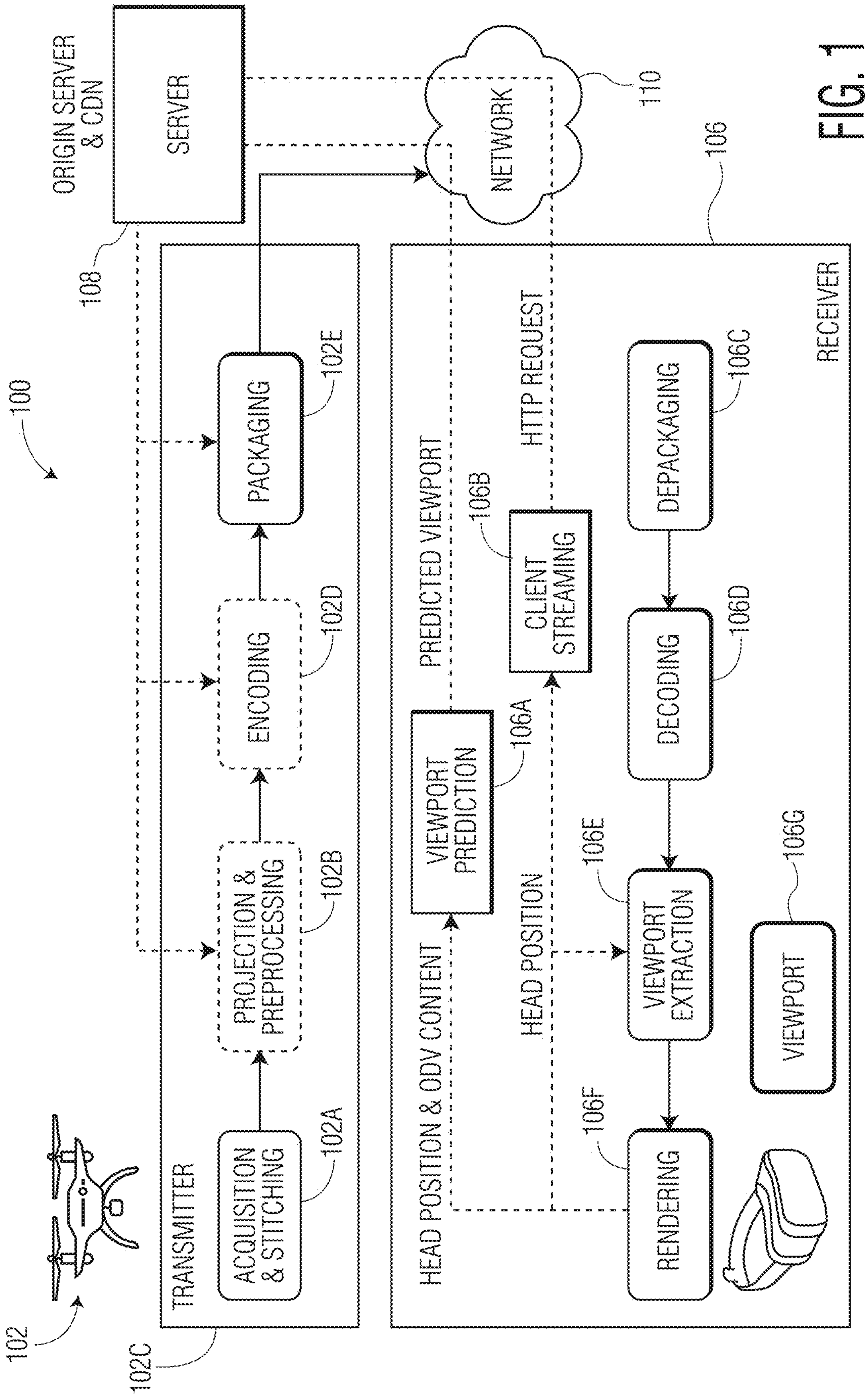
FIG. 1 shows a block diagram of an omnidirectional video streaming system, according to an example embodiment of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatus as known by one of ordinary skill in the relevant art may not be discussed in detail but are intended to be part of the specification where appropriate. In all the examples illustrated and discussed herein, any specific values should be interpreted to be illustrative and non-limiting. Thus, other example embodiments may have different values. Notice that similar reference numerals and letters refer to similar items in the following figures, and thus once an item is defined in one figure, it is possible that it need not be further discussed for the following figures. Below, the example embodiments will be described with reference to the accompanying figures.

The market for omnidirectional (e.g., 360 degree) videos is expected to sec rapid growth in the near future. Emerging applications, such as real-time control of machines including drones, such as unmanned aerial vehicles (UAVs), and metaverse applications, require real-time transmission of 360° videos. Real-time streaming requirements for these applications place tight constraints on both throughput and end-to-end latency. Low complexity learning based solutions can be used for meeting these tight constraints for omnidirectional video streaming.

This disclosure is directed to a learning-based method for fast and accurate real-time adaptation of encoding parameters to real-time variations in network conditions caused by wireless channels such as non-stationarity in vehicular networks, and video content. This solution facilitates attaining a lower end-to-end or motion-to-photon latency while simultaneously maintaining high video quality for an enhanced user experience.

The quality of the user experience in an omnidirectional video streaming pipeline can generally be quantified by one or more metrics including but not limited to Glass-to-Glass latency (time duration from capturing video to displaying video), end-to-end latency (time duration to receive communication via the network), Motion-to-photon latency (time lag duration between the actual movement of a physical object to the movement being displayed), perceived video quality in the field of view (resolution, blurring, etc.), and freezing time (time duration which video stream freezes). In general, about 80-90 percent of the latency is a result of video processing, instead of network latency. Latency induced by the video processing pipeline is directly proportional to the number of pixels to be processed, or frame resolution of the video. To provide a high-quality user experience (i.e., to obtain a high-quality omnidirectional video transmission with low latency), it is beneficial to adapt video frame encoding parameters according to not only network conditions but also video content. In general, the encoder rate is a non-linear function of various factors including Quantization parameter, Frame rate, Resolution, Video content, and Video codec operation.

The disclosed methods, devices and systems herein overcome the limitations of the existing omnidirectional video systems by providing a machine learning based solution that performs joint prediction of quantization parameters, adaptive input resolution and frame rate, and adaptive field-of-view resolution. In one example, this solution is achieved through a reinforcement learning based approach which is described in more detail in reference to the figures.

Benefits of the disclosed methods, devices and systems include but are not limited to accurately and rapidly determining appropriate frame processing and video coding parameters. These parameters are used to dynamically adjust frame processing video coding of a real-time omnidirectional video stream to produce a processed/encoded video stream that ensures quality user experience that reduces latency and increases video quality. Although the examples described with respect to the figures are applicable to omnidirectional videos, it is noted that the methods/systems described herein are also applicable to standard 2-dimensional video streams. Examples of the solution are described in the figures below.

FIG. 1 shows a block diagram 100 of an omnidirectional video streaming system. In some embodiments, the system generally includes a transmitter 102C and a receiver 106 communicating with one another via a network 110. In one example, the transmitter can be hosted on a drone 102 (UAV) that includes an omnidirectional camera platform that may include multiple cameras having a field of view of a fraction of the overall 360° field of view. The cameras may be arranged in a circular pattern at radial angles relative to one another such that the cameras capture the 360° field of view in the aggregate. The captured video frames for each individual camera are then stitched together in block 102A. Stitching to produce the 360° image generally can include combining the video frames end-to-end to produce a seamless 360° image. More specifically, stitching may include calibration of the cameras relative to one another, synchronization of the videos in time to ensure frames being stitched together were captured at the same time, alignment of the frames based on common features, blending the stitched edges of the frames.

In block 102B, the 360° image may be projected and pre-processed. The pre-processing may include mapping (e.g., warping) the 360° image onto a specific shape (e.g., mapping from rectangular images to spherical coordinates, distortion correction due to projection, resolution optimization and color processing). Once pre-processed, the 360° image may be encoded at block 102D which generally performs data compression of the 360° image (i.e., 360° video frame). This encoding may be performed spatially (within frames) and temporally (between frames). The generated encoded data frames are then packaged in a sequence of intra-coded frames, predicted frames and bidirectional frames at block 102E and transmitted as a sequence to receiver 106 through network 110. Transmission of the 360° images of a 360° video stream may be triggered in response to a request from client streaming block 106B which sends a request to streaming server 108 via network 110.

In any event, upon receiving the frames, de-packaging block 106C unpacks the packaged frames and block 106D decodes the encoded frames. Essentially blocks 106C and 106D perform the reverse operation as blocks 102E and 102D in the transmitter 102C. Once the 360° image is decoded, block 106E performs viewport extraction. This viewport extraction may be based on the orientation of viewport 106G in free-space as determined by viewport prediction block 106A. In other words, the system determines which portion of the 360° image to display to the end user depending on orientation of the end user's head. Generally, the user is determined to be positioned within a 360° sphere where the 360° image is surrounding the image in free-space thereby simulating a 360° environment around the user. If the user is looking straight up wearing the VR goggles, for example, then the viewport extracted is a view of a top section of the 360° image. The size and shape of the viewport may be based on various factors including but not limited to the field of view of the VR goggles. In any event, once the viewport is extracted, the viewport is displayed in the VR goggles by rendering block 106F. The viewport in one application may be VR goggles where the viewport has a predetermined field of view of the 360° image depending on the orientation of the goggles as mentioned above. This process is continuously performed to provide the end user with a desired field of view of the 360° image as the user observes different portions of the virtual environment. Furthermore, the 360° image is periodically updated at the frame rate of the video stream so that the user experiences a seamless VR environment.

Figure 2:
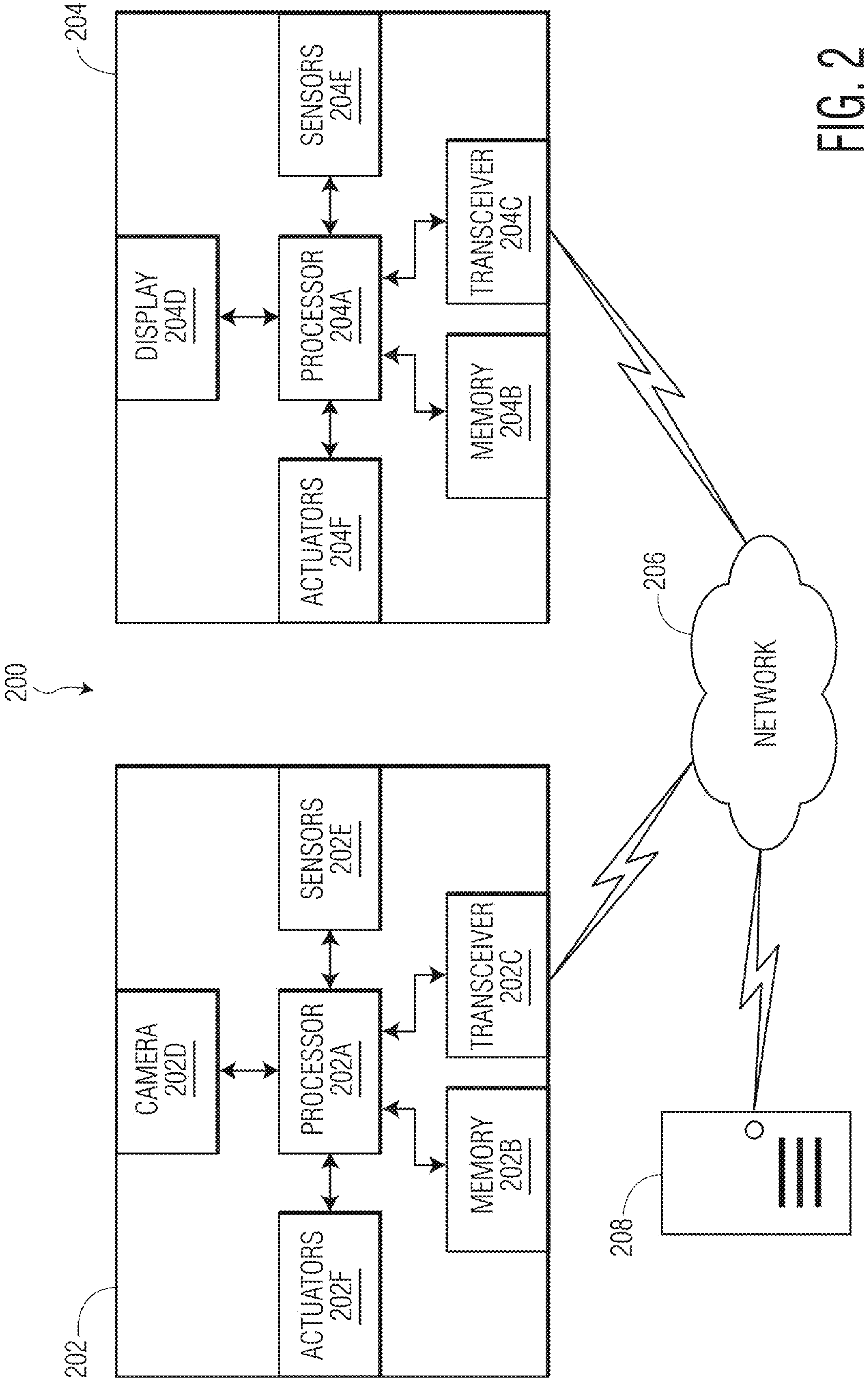
FIG. 2 shows a block diagram of hardware for the omnidirectional video streaming system, according to an example embodiment of the present disclosure.

FIG. 2 shows a block diagram 200 of hardware for the omnidirectional video streaming system shown in FIG. 1. The hardware system generally includes drone hardware 202, user device hardware 204 (e.g., VR goggles) and server hardware 208 connected to one another via network 206. Drone 102 performing the capturing, encoding and transmission of the 360° image may include hardware 202 having processor 202A, memory 202B, wireless transceiver 202C, omnidirectional camera 202D, sensors 202E and actuators 202F. Processor 202A may execute software from memory 202B that controls the operation of the drone (i.e., altitude, trajectory, navigation, etc.) by sensing drone state parameters (e.g., speed, direction, etc.) and adjusting actuators 202F (e.g., propellers, etc.) accordingly such that omnidirectional camera 202D is able to capture the desired 360° images and produce the omnidirectional video stream.

Similarly, user device (e.g., VR goggles) performing the viewport determination and display of the omnidirectional video stream may include hardware 204 having processor 204A, memory 204B, wireless transceiver 204C, omnidirectional video display screen 204D, sensors 204E and actuators 204F. Processor 204A may execute software from memory 204B that controls the operation of the goggles (i.e., display of the determined viewport, display contrast/brightness, etc.) by sensing orientation/movement of the VR goggles in 3D space, adjusting the viewport accordingly and using actuators 204F to provide haptic feedback (e.g., vibrations, etc.) accordingly to provide a desired user experience.

The control of the drone may be performed by the end user wearing the goggles or by a third party. For example, drone processor 202A may receive operational instructions from end user hardware 204 or server hardware 208 via network 206. The captured and encoded omnidirectional video stream is generally transmitted from drone transceiver 202C to user device transceiver 204C via network 206. This transmission is generally a wireless transmission and may include any wireless technology including but not limited to cellular, WiFi, Bluetooth, etc.

Figure 3:
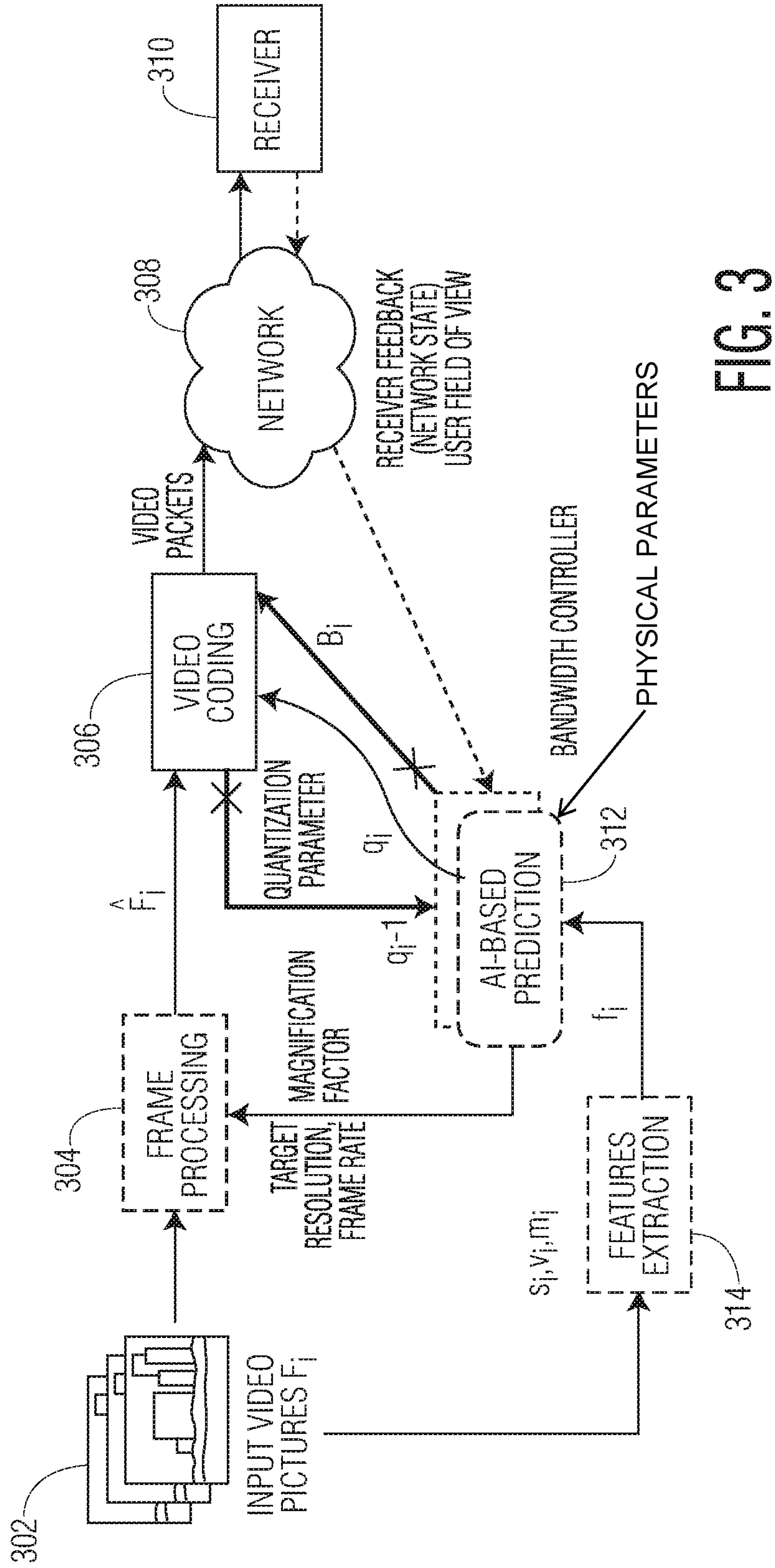
FIG. 3 shows a block diagram of the operation of an omnidirectional video streaming system, according to an example embodiment of the present disclosure.

As mentioned above, constraints on an omnidirectional video streaming system are strict based on network performance and capabilities due to the significant amount of data that is processed and transmitted through the network to support a seamless omnidirectional video streaming experience for the end user. FIG. 3 shows a block diagram 300 of the operation of the omnidirectional video streaming system which controls frame processing and video encoding parameters in a fast and accurate manner based on measured network performance and video features extracted from the captured video. In general, the video collector/transmitter (e.g., drone) encodes the video frames in packets (e.g., real-time protocol (RTP) packets). The video receiver (e.g., VR goggles) records information about received packets and sends feedback to the video collector. The feedback generally includes network state information useful to frame processing and video encoding. The feedback also includes the field of view of the end user. The bandwidth controller at the video collector/transmitter executes a machine learning algorithm (e.g., reinforcement learning) that intelligently utilizes the network state information and certain features extracted from the image in the user's identified field of view to estimate the target sending bitrate, determine frame processing parameters (e.g., resolution, frame rate, magnification factor) and determine video coding parameters (e.g., quantization parameter) that result in an optimal user experience.

More specifically, in one example, the omnidirectional video streaming system 300 operates as follows. The 360° images 302 are input frame-by-frame to frame processing block 304 where frame processing is performed according to a target pixel resolution, frame rate and magnification factor. The processed frames are then encoded at block 306 and transmitted as a sequence of video packets to receiver (e.g., VR goggles) 310 via network 308. Receiver 310 with or without the aid of server 108 (not shown) computes network state metrics (e.g., latency, bandwidth, throughput, packet loss, jitter, error rate, round trip time, quality of service, etc.). Receiver 310 then transmits the network state metrics as well as the detected field of view of the user device (e.g., VR goggles) to the transmitter via network 308. As mentioned above, the detected field of view of the user device may be dictated by the orientation of the VR goggles in free space as determined by sensors (e.g., accelerometer, gyroscope, etc.) and by the size/shape of the VR goggles. Once received, a machine learning artificial intelligence (AI) based prediction block 312 of the transmitter utilizes the field of view of the user device to extract certain features from the corresponding viewport of the image at features extraction block 314. In other words, the portion of the 360° image being viewed by the end user at any given time is analyzed for image parameters including, inter-frame information (e.g., image detail) and intra-frame information (e.g., motion of objects in the image). These image parameters and the network state parameters are then input to the machine learning algorithm (e.g., reinforcement learning algorithm) which predicts and updates the frame processing parameters and the video coding parameters which are then reported to frame processing block 304 and video coding block 306. Upon updating these parameters, frame processing block 304 and video coding block 306 update their operations to better perform frame processing and video coding based on the network state while taking into account the portion of the 360° image being viewed by the user.

In one example, the video capturing and processing platform in FIG. 3 may be hosted on a UAV having an omnidirectional camera. The UAV may be controlled by an end user manipulating a joystick and wearing VR goggles. The goal of the UAV may be to capture omnidirectional video and transmit the video to the VR goggles such that the end user has the experience of piloting the UAV. The omnidirectional camera continuously captures, processes (using frame processing and video coding parameters) and transmits the viewport of the omnidirectional video to the VR goggles via the network. In other words, a section of the omnidirectional video is transmitted based on the orientation and field of view of the VR goggles. For example, if the end user is facing forward, the forward section of the omnidirectional video is transmitted so that the end user views what is in front of the UAV as it is flying. During operation, the end user may move their head to look to the left or right of UAV at which point the UAV will transmit the appropriate viewport of the omnidirectional video to the VR goggles. As network conditions vary (e.g., due to signal strength, network usage, and other factors), the video capturing and processing platform of the UAV will adjust the processing parameters to meet the limitations of the network state accordingly. Again, the processing parameters are adjusted inter-frame and/or intra-frame based on the video frame content to reduce the amount of data transmitted while maintaining high quality user experience. This may result in reduced resolution and quantization of portions of the video frames including insignificant content while maintaining resolution and quantization of portions of the video frames including significant content. In other words, the end user may experience lower quality frames or portions of frames at certain times during the video stream with the goal of avoiding frame freezing. Essentially, quality is diminished in insignificant frames or insignificant portions of the frames to avoid overloading the network and causing video freezing. The diminished quality of the frames or positions of the frames do not significantly impact user experience because the features that are diminished (e.g., background content, static content, etc.) are not important to the end user when piloting the UAV.

Figure 4:
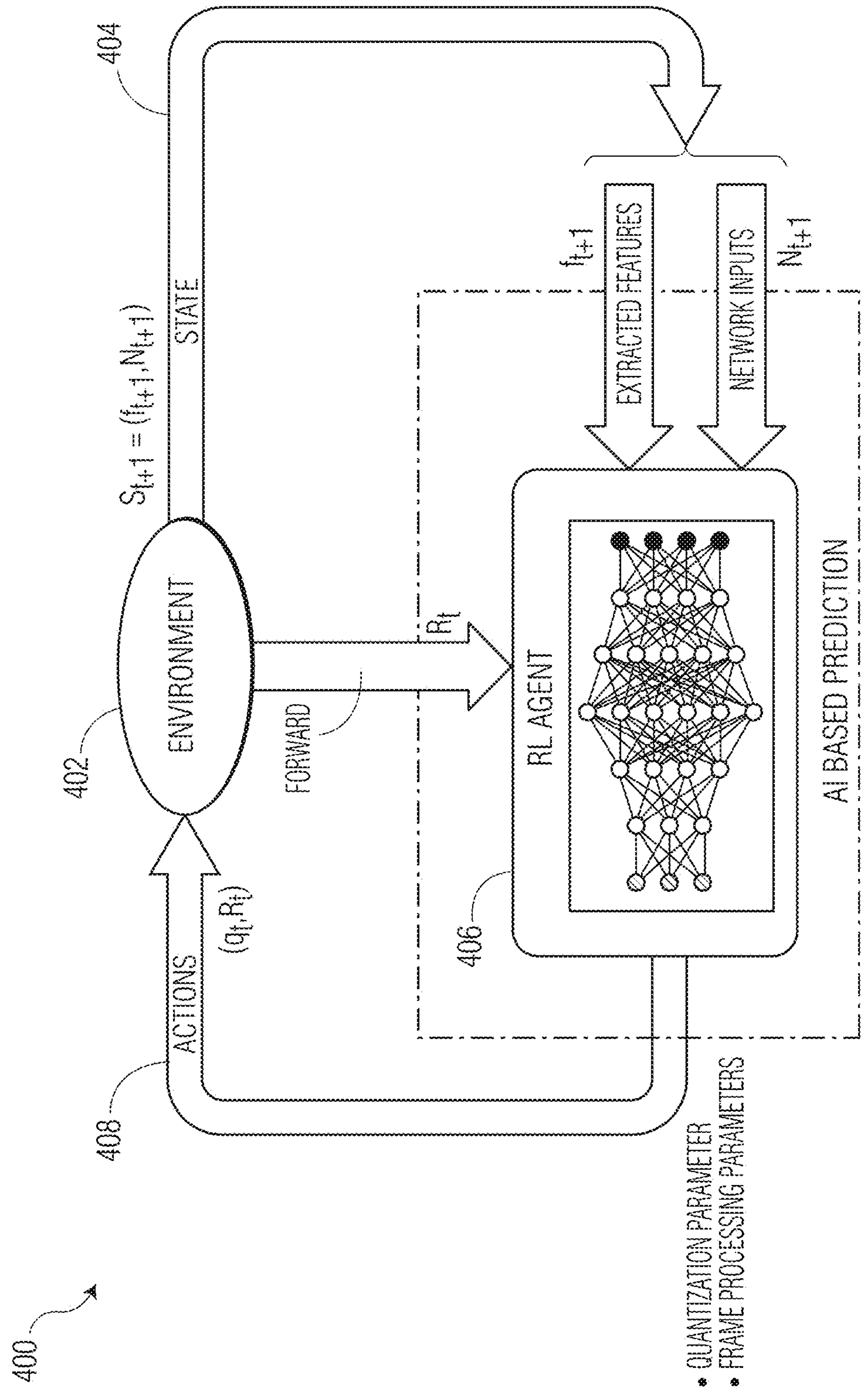
FIG. 4 shows a block diagram of the operation of a reinforcement learning algorithm of the omnidirectional video streaming system, according to an example embodiment of the present disclosure.

FIG. 4 shows a block diagram 400 of the operation of a reinforcement learning algorithm of the omnidirectional video streaming system. Reinforcement learning is a type of machine learning model that observes an environment and takes actions to reach a desired goal. The predictions are performed according to a policy (i.e., strategy) that is adjustable based on feedback received in the form of a reward. The reinforcement learning algorithm learns by receiving a reward which is computed according to a function defined to capture a desired goal. For example, the goal may be to minimize video frame freezing. In this example, if the reinforcement learning algorithm takes actions (i.e., adjusts frame processing and video encoding) that lead to a reduction in future frame freezing, then the reinforcement learning algorithm is given a positive reward. If, however, the reinforcement learning algorithm takes actions (i.e., adjusts frame processing and video encoding) that lead to an increase in future frame freezing, then the reinforcement learning algorithm is given a negative reward. In either case, the reinforcement learning algorithm uses the reward to make adjustments to its prediction process. The goal of the reinforcement learning algorithm is to maximize the rewards thereby reaching the goal (e.g., minimizing frame freezing).

The reinforcement learning algorithm implemented herein includes a reinforcement learning network 406 that receives state information 404 of environment 402. The state information may include network state parameters $\mathcal{N}_t$ (e.g., packet delay, packet jitter, packet buffer length, etc.) from the receiver and extracted features $f_t$ (e.g., image detail, object movement) from the images according to the viewport of the user. These inputs are used by the reinforcement learning network 406 to predict optimal frame processing parameters and encoding parameters by updating model weights in an iterative manner. Frame processing parameters may include but are not limited to frame rate (number of frames displayed per second), resolution (dimensions of each frame), and magnification factor. Encoding parameters include but are not limited to quantization parameter (how values are quantized to bits). Actions 408 are then taken (e.g., instructions of resolution and quantization parameters are sent) to adjust the frame processing and encoding algorithms according to the predicted optimal frame processing and encoding parameters. The reward function utilized by the reinforcement learning algorithm may be defined to capture an objective of system requirements. These requirements may include one or more of minimizing video freeze time, minimizing glass-to-glass latency, etc. During operation, the reinforcement learning algorithm attempts to maximize rewards by adjusting its predictions based on the extracted features and network inputs. If certain adjustments lead to positive rewards (i.e., a reduction in video freezing), then the reinforcement learning algorithm tends to make similar adjustments in the future. However, if certain adjustments lead to negative rewards (i.e., an increase in video freezing), then the reinforcement learning algorithm tends to make different adjustments in the future in an attempt to receive positive rewards. Possible reinforcement learning algorithms may take the form of Q-learning, deep Q network, proximal policy optimization and actor-critic algorithms to name a few.

As the network state deteriorates, the reinforcement learning algorithm may adjust the frame processing parameters to reduce target resolution and/or frame rate and/or adjust the encoding parameters to reduce the number of quantization bits. The reduction of these parameters may be more significant for portions of the video frames that include background images that do not change or have much contrast. In contrast, the reduction of the parameters may be less significant for portions of the video frames that include objects in motion or objects requiring contrast. In other words, portions of the frames or the entire frame are processed and encoded based not only on the network quality but also based on how the video content will be affected thereby ensuring that the user experience does not suffer. For example, the amount of data can be significantly reduced inter-frame or intra-frame for video content that is not significant to the user experience, while the amount of data may be reduced to a lesser extent inter-frame or intra-frame for video content that is significant to the user experience. The overall amount of data and rate of data may therefore be reduced to address the network state, while also ensuring that the user experience is maintained at a high quality.

Figure 5:
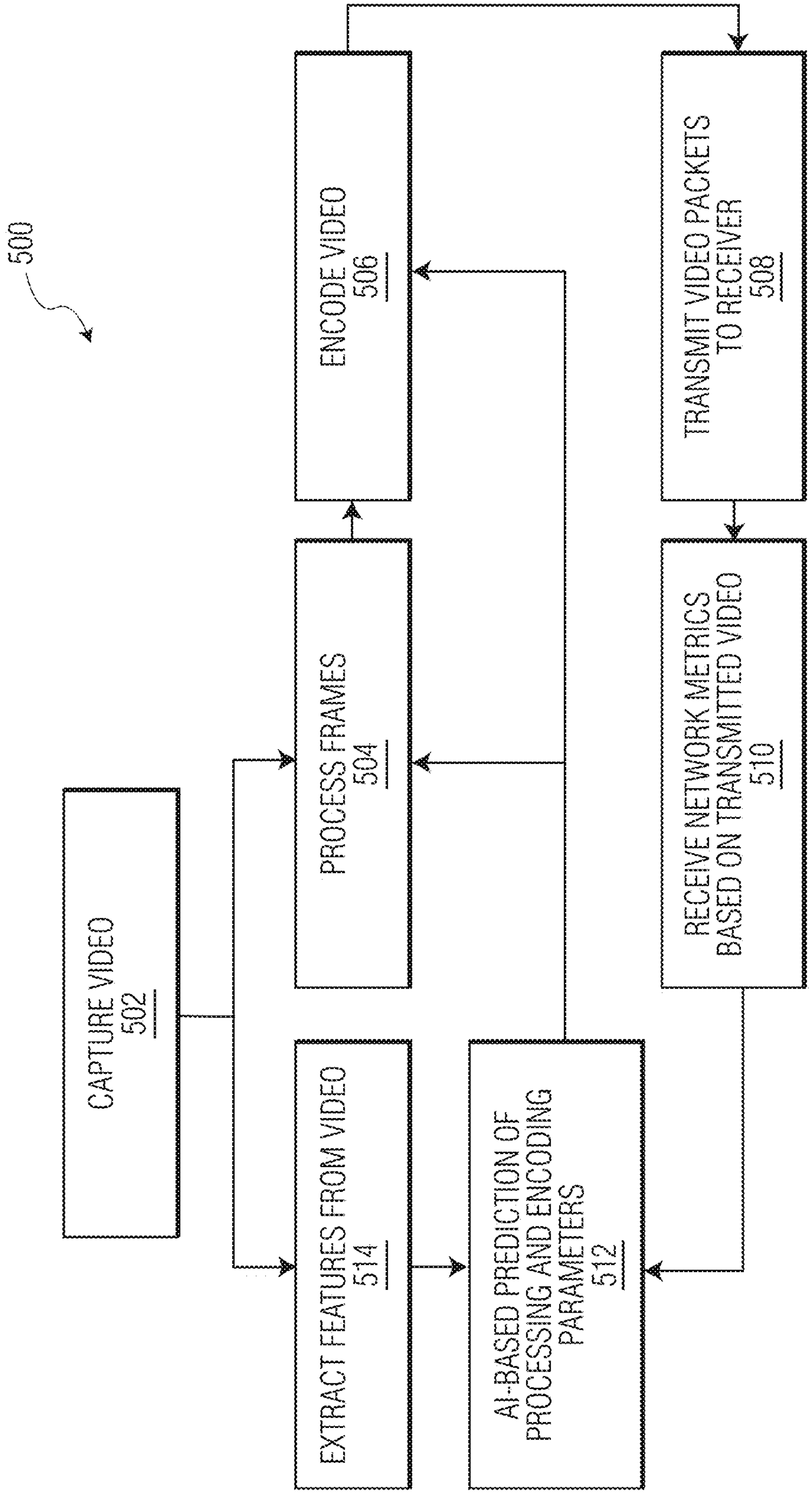
FIG. 5 shows a flowchart of operation of the omnidirectional video streaming system, according to an example embodiment of the present disclosure.

FIG. 5 shows a flowchart 500 of operation of the omnidirectional video streaming system. In step 502, the omnidirectional video camera (e.g., positioned on the drone) captures video in the form of a sequence of various images from various cameras. These images are stitched (i.e., combined and blended) together to form a sequence of 360° images (360° video stream). The stitched images of the 360° video are then frame processed in step 504 and encoded in step 506. The encoded frames are then transmitted (via the network) to the receiver in step 508. The receiver then computes network state metrics based on the received encoded frames and transmits the network state metrics back to the transmitter in step 510. The received network state metrics are input to reinforcement learning algorithm at step 512. In addition, the transmitter, in step 514, also can extract certain features from frames of the 360° video and inputs them to reinforcement learning algorithm at step 512. The features are generally extracted from a certain portion (i.e., viewport) of the frames of the 360° video and may be inter-frame features and/or intra-frame features. The viewport is generally designated by the receiver based on the orientation and movement of the wearable user display device (e.g., VR goggles) at a given moment in time. The reinforcement learning algorithm at step 512 utilizes the extracted features corresponding to the field of view of the end user, as well as the network metrics determined by the end user device to predict both frame processing and encoding parameters. As mentioned above, features important to user experience may be afforded high quality parameters than features that are less important to the user experience. Once predicted, these parameters are used to adjust the frame processing algorithm and encoding algorithm for future frames. Upon receiving feedback from the receiver device corresponding to a desired goal (e.g., minimizing video freezing, etc.), the reinforcement learning algorithm is issued a positive or negative reward proportional to the effects on the desired goal. In other words, the reinforcement learning algorithm receives a good reward when parameter adjustments lead to reduction in future video freezing, while the reinforcement learning algorithm receives a bad reward when adjustments lead to increased future video freezing. Upon being issued the reward, the reinforcement learning algorithm makes adjustments to its policy for adjusting the parameters in an attempt to maximize the good rewards. This process can be repeated periodically and in real-time during transmission of the 360° video so that the transmitter dynamically and optimally responds to varying network conditions in a rapid and efficient manner.

It is noted that although the examples here refer to operation of the omnidirectional video streaming system, the same methods can also be applicable to 2D video streaming captured by 2D cameras. In 2D video streaming, the system may not require viewport feedback from the receiver but may rather extract features from the entire 2D image which is the effective viewport. The extracted image features along with the network metrics are utilized by the reinforcement learning algorithm as mentioned above to adjust frame processing and video encoding performed at the transmitter with the goal of achieving a specific performance (e.g., minimized video freezing, etc.).

While the foregoing is directed to example embodiments described herein, other and further example embodiments may be devised without departing from the basic scope thereof. For example, aspects of the present disclosure may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A system for controlling video streaming, the system comprising:

a 360° video camera configured to capture 360° video and create a video stream; and at least one processor configured to:

capture at least one physical parameter comprising at least one of motion or orientation of the 360° video camera or a user device viewing the 360° video;

determine a viewport of the user device based at least in part on the at least one physical parameter, the viewport corresponding to a field of view of the user device in the 360° video;

process the video stream according to at least one processing parameter to produce a processed video stream;

extract at least one video feature from the video stream, the at least one video feature comprising at least one of detail or motion in the 360° video corresponding to the viewport;

encode the processed video stream according to at least one encoding parameter to produce an encoded video stream;

transmit the encoded video stream through a network;

receive at least one network metric based on the encoded video stream transmitted through the network;

during real-time streaming of the 360° video, input the at least one video feature, the at least one physical parameter, and the at least one network metric to a reinforcement learning model to predict updates to the at least one processing parameter and the at least one encoding parameter based at least in part on the field of view, wherein the reinforcement learning model updates prediction weights based on a performance metric computed during the real-time streaming; and process the video stream and encode the processed video stream according to the updates to the at least one processing parameter and the at least one encoding parameter.

2. The system of claim 1, wherein the reinforcement learning model receives a reward based on the performance metric and updates the prediction weights based on the reward.

3. The system of claim 1, wherein the performance metric for computing the reward comprises at least one of video freezing time, latency between a time of capturing the video to a time of displaying the video, or video quality.

4. The system of claim 1, wherein the at least one network metric comprises at least one of network bandwidth, latency, packet loss, jitter and error rate.

5. The system of claim 1, wherein the at least one processing parameter comprises at least one of video resolution, frame rate, or magnification; and wherein the at least one encoding parameter comprises video quantization or encoding rate.

6. The system of claim 1, wherein the at least one processor is further configured to transmit the video stream to a wearable device that displays the viewport of the 360° video.

7. The system of claim 6, wherein the wearable device is virtual reality (VR) goggles.

8. The system of claim 6, wherein the video camera is mounted to a drone for capturing the 360° video from a perspective of the drone.

9. The system of claim 8, wherein the processor is further configured to capture at least one drone parameter comprising at least one of velocity, position or altitude of the drone and input the at least one drone parameter to the reinforcement learning model to predict the updates to the at least one processing parameter and the at least one encoding parameter.

10. A method for controlling video streaming, the method comprising:

capturing 360° video, by a 360° video camera, and creating a video stream;

capturing, by at least one processor, at least one physical parameter comprising at least one of motion or orientation of the 360° video camera or a user device viewing the 360° video;

determining, by the at least one processor, a viewport of the user device based at least in part on the at least one physical parameter, the viewport corresponding to a field of view of the user device in the 360° video;

processing, by the at least one processor, the video stream according to at least one processing parameter to produce a processed video stream;

extracting, by the at least one processor, at least one video feature from the video stream, the at least one video feature comprising at least one of detail or motion in the 360° video corresponding to the viewport;

encoding, by the at least one processor, the processed video stream according to at least one encoding parameter to produce an encoded video stream;

transmitting, by the at least one processor, the encoded video stream through a network;

receiving, by the at least one processor, at least one network metric based on the encoded video stream transmitted through a network;

during real-time streaming of the 360° video, inputting, by the at least one processor, the at least one video feature, the at least one physical parameter, and the at least one network metric to a reinforcement learning model to predict updates to the at least one processing parameter and the at least one encoding parameter based at least in part on the field of view, wherein the reinforcement learning model updates prediction weights based on a performance metric computed during the real-time streaming; and processing, by the at least one processor, the video stream and encoding the processed video stream according to the updates to the at least one processing parameter and the at least one encoding parameter.

11. The method of claim 10, further comprising:

wherein the reinforcement learning model receives a reward based on the performance metric, and updates the prediction weights based on the reward.

12. The method of claim 10, further comprising:

computing, by the at least one processor, the reward based on a performance metric comprising at least one of video freezing time or latency between a time of capturing the video to a time of displaying the video, or video quality.

13. The method of claim 10, further comprising:

receiving, by the at least one processor, the at least one network metric comprising at least one of network bandwidth, latency, packet loss, jitter or error rate.

14. The method of claim 10, further comprising:

setting, by the at least one processor, at least one of video resolution, frame rate, or magnification as the at least one processing parameter; and setting, by the at least one processor, video quantization as the at least one encoding parameter or encoding rate.

15. The method of claim 10, further comprising:

transmitting, by the at least one processor, the video stream to a wearable device that displays the viewport of the 360° video.

16. The method of claim 15, further comprising:

transmitting, by the at least one processor, the video stream to the wearable device that comprises virtual reality (VR) goggles.

17. The method of claim 15, further comprising:

capturing, by the video camera, the 360° video from a perspective of a drone to which the camera is mounted.

18. The method of claim 17, further comprising:

capturing, by the at least one processor, at least one drone parameter comprising at least one of velocity, position or altitude of the drone; and inputting, by the at least one processor, the at least one drone parameter to the reinforcement learning model to predict the updates to the at least one processing parameter and the at least one encoding parameter.

* * * * *